United States Patent
Brandwine

(10) Patent No.: US 9,003,412 B1
(45) Date of Patent: *Apr. 7, 2015

(54) PERFORMING IDENTIFIED REPEATABLE COMPUTATIONS IN A CHANGING COMPUTING ENVIRONMENT

(71) Applicant: Amazon Technologies, Inc., Reno, NV (US)

(72) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,860

(22) Filed: Oct. 28, 2013

Related U.S. Application Data

(63) Continuation of application No. 12/648,131, filed on Dec. 28, 2009, now Pat. No. 8,572,613.

(51) Int. Cl.
- *G06F 9/46* (2006.01)
- *G06F 9/455* (2006.01)
- *G06F 9/44* (2006.01)
- *G06F 9/45* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | |
|---|---|---|
| 6,978,401 B2 | 12/2005 | Avvari et al. |
| 7,823,023 B2 | 10/2010 | Kwan et al. |
| 7,831,962 B2 | 11/2010 | Banerjee et al. |
| 8,347,288 B1 | 1/2013 | Brandwine |
| 2005/0028146 A1 | 2/2005 | Quick |
| 2005/0223362 A1 | 10/2005 | Whitlock et al. |
| 2006/0294434 A1 | 12/2006 | Ikeda et al. |
| 2008/0155169 A1 | 6/2008 | Hiltgen et al. |
| 2008/0209415 A1 | 8/2008 | Van Riel et al. |
| 2010/0223499 A1 | 9/2010 | Panigrahy et al. |
| 2010/0274991 A1 | 10/2010 | Duan et al. |

*Primary Examiner* — Mengyao Zhe
*Assistant Examiner* — Bing Zhao
(74) *Attorney, Agent, or Firm* — Robert C. Kowert; Meyertons, Hood, Kivlin, Kowert & Goetzel, P.C.

(57) ABSTRACT

A physical computer system includes a processor and a memory configured to store instructions executable by the processor to implement a virtualization module, which in turn implements virtual machine(s) that execute an operating system distinct from any underlying operating system executed by the physical computer system. In response to a client request to initially perform a repeatable computation, the virtualization module instructs that the virtual machine(s) archive an original initial state of the repeatable computation, initially perform the repeatable computation, and archive an original terminal state of the repeatable computation. In response to a client request to repeat the repeatable computation, the virtualization module instructs that the virtual machine(s) be initialized according to configuration information indicated by the archived original initial state of the repeatable computation, and that the one or more virtual machines perform the repeatable computation to generate a new terminal state of the repeatable computation.

20 Claims, 5 Drawing Sheets

PERFORMING IDENTIFIED REPEATABLE COMPUTATIONS IN A CHANGING COMPUTING ENVIRONMENT

This application is a continuation of U.S. application Ser. No. 12/648,131, filed Dec. 28, 2009, now U.S. Pat. No. 8,572,613, which is hereby incorporated by reference in its entirety.

BACKGROUND

In a typical model of computing, input data is provided to a computational process to produce a result, which may then be used for some purpose. For example, a user may insert a compact disc (CD) containing music into a computer, and a program executing on the computer may read the music data, convert it to an MP3-encoded format, and store it within a library for use with a portable media device. In many contexts, once a computational result is generated, there may be little concern over whether the result can be regenerated in exactly the same way. For example, having once encoded the CD, the above user might be unlikely to ever want to do so again, unless the encoded files were lost or corrupted. Even then, the user might simply re-encode the CD using a different computer or program, because it is unlikely that variations in the encoded output would be noticeable to the user. Even though two audio files may be different, they may be functionally equivalent in their actual use.

However, for some computing applications, being able to repeat a computation so as to reproduce results (e.g., exactly, or to a defined degree) may be important. For example, as part of the diligence required for regulatory approval, a drug manufacturer may supply the results of computer simulations of drug behavior. At some later time, it may be necessary to validate the results. For example, the manufacturer may be required to prove that the results upon which regulatory approval was granted were not fabricated, to prove that the results were generated under required assumptions or constraints, to prove that a required protocol was followed in generating the results, or may need to demonstrate the integrity of the results for other reasons. Thus, the manufacturer may need the capability to repeat the original simulations, in order to demonstrate that the original results follow from the original computational inputs.

But even small variations in hardware or software configuration between the time results are originally generated and the time they are reproduced may affect the exactness with which the reproduced results match the original ones, especially in applications where a high degree of numerical precision is needed. Moreover, hardware and software evolve at a rapid pace, with new versions of both emerging annually or even more frequently. Thus, the pace of the technology replacement cycle tends to frustrate the goal of producing repeatable results, particularly after periods of years have elapsed.

Figure 1:
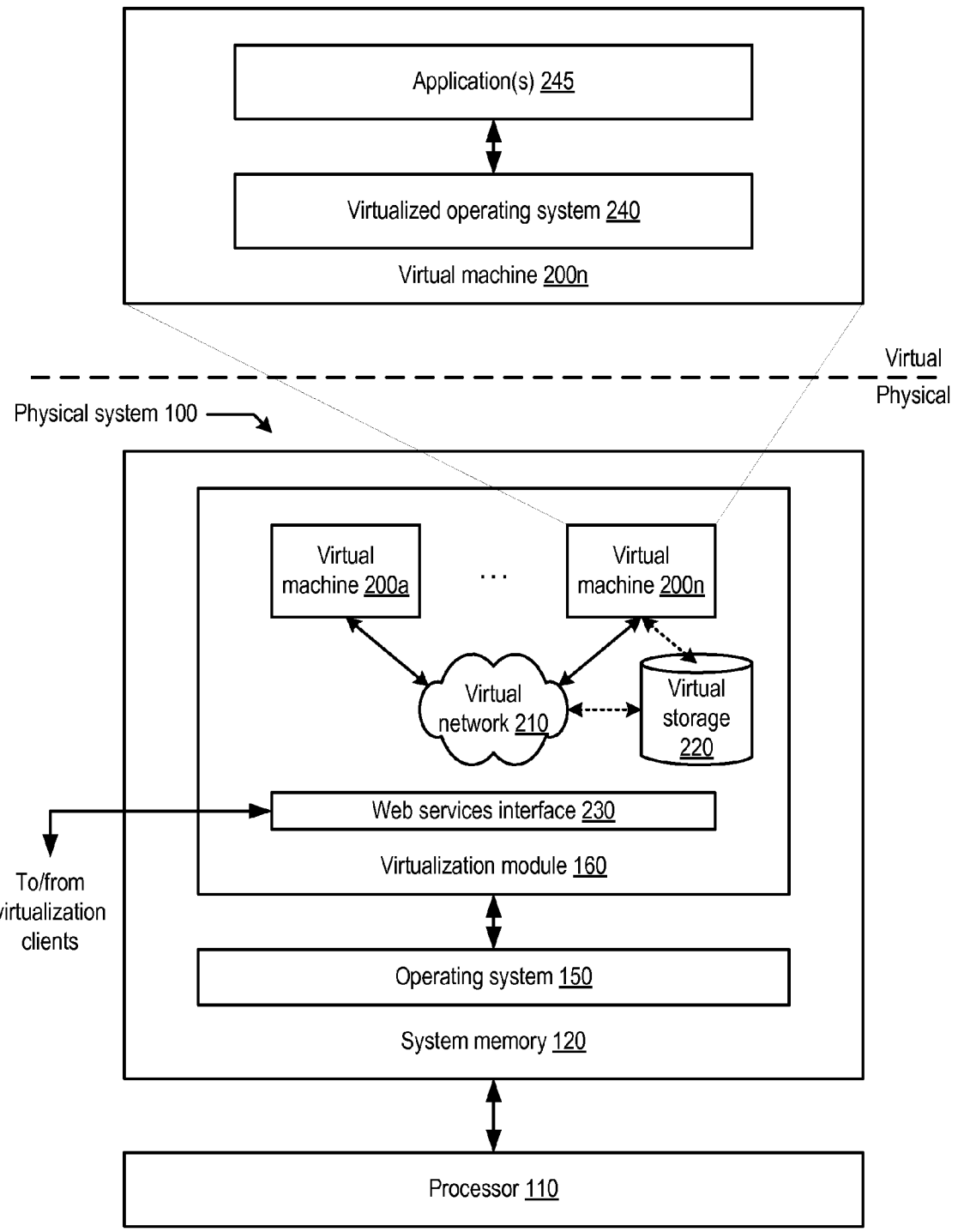
FIG. 1 illustrates an embodiment of a system configured to implement virtualized computing.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

As noted above, in certain contexts, being able to precisely and accurately reproduce computational results may be desirable. In addition to the regulatory compliance example mentioned above, such contexts might include scientific peer review, the computational analysis of evidence in legal proceedings (e.g., DNA evidence, fingerprints, etc.), complex financial accounting, aerospace engineering, civil engineering, or any other context in which the integrity of a computational process may be subject to questioning or validation. In general, applications or types of computation that are expected to produce repeatable results may be referred to as "repeatable applications" or "repeatable computing."

A number of factors may affect the repeatability of results. For example, the same set of source code (i.e., an abstract specification of computational behavior) might produce different object code (i.e., machine instructions executable by a microprocessor) when compiled for different processors or instruction set architectures (ISAs). Two different compilers may produce different object code from the same source code even when targeted to the same ISA. Thus, even though these various sets of object code may be functionally equivalent to the original source code, they may not be identically expressed. Such variations would fail a stringent repeatability test that requires the hardware state of the machine (or at least a defined region of the hardware state that is specific to the application) to be bitwise identical across repetitions.

Other factors may also cause divergent results. For example, source code authors often rely on functions or routines provided in external libraries, for example, by an operating system or by third parties. Thus, using a different version of an OS or a particular library may yield differences in execution behavior for the same application.

Applications that depend upon generating results with a high degree of numerical precision may be particularly sensitive to variations in the hardware or software making up the computing environment. For example, different versions of floating-point arithmetic hardware may produce slightly different results (e.g., in the least significant digit(s)) for the same operation, depending on how the different implementations handle rounding errors, approximation of transcendental functions, or other issues related to high-precision arithmetic. Similarly, in some instances, applications may depend upon software libraries to perform high-precision arithmetic. Results produced by different versions of such libraries, or even the same library running on different hardware, may vary.

Depending upon the stringency with which an application is expected to be repeatable and the uncertain effects that configuration changes may have on repeatability, there may be little choice but to maintain a computer system in as close to a static configuration as possible for as long as an application is expected to be repeatable. For example, this may entail preserving the same hardware and software configuration of a computer system for a number of years.

As an alternative to preserving legacy systems for arbitrary lengths of time, implementing repeatable applications using virtualized computing may offer greater flexibility and more efficient utilization of computing resources. In the following sections, an overview of virtualized computing is first provided. Various techniques for implementing repeatable computing using virtualized computing systems are described. Finally, an example computer system that may be configured to implement various ones of the described techniques is discussed.

Overview of Virtualized Computing

Generally speaking, virtualized computing (which may also be referred to as virtual computing or virtualization) may refer to techniques for configuring a physical computer system so that it appears, from a software perspective, to behave like multiple independent "virtual" computer systems. Virtualized computing may be distinguished from a conventional multitasking operating system (OS). A typical OS may provide a number of protected memory spaces in which different processes may execute without interfering with one another, as well as a common set of privileged routines to manage execution of those processes and coordinate access to system resources. By contrast, virtualized computing techniques may be employed to configure multiple virtual machines, each of which may execute its own operating system, which may be different for different virtual machines.

By decoupling the configuration and operation of a virtual machine from the underlying physical hardware on which the virtual machine executes, virtualized computing may enable a user to configure a virtual machine according to a defined set of specifications, and to recreate the previously configured virtual machine at a later time, all without altering the configuration of the underlying physical hardware. This may facilitate the implementation of repeatable computing, in that it may be considerably easier to restore the configuration of a virtual machine than to restore or maintain the configuration of a physical machine.

An example of a system that may be configured to implement virtualized computing is illustrated in FIG. 1. In the illustrated embodiment, physical system 100 includes a processor 110 coupled to a system memory 120. For example, processor 110 may correspond to any type of microprocessor configured to execute instructions defined by a particular instruction set architecture (ISA), such as the x86/x64 ISA, the PowerPC™ ISA, the SPARC™ ISA, the ARM™ ISA, or any other suitable ISA. System memory 120 may correspond to any type of storage device configured to store data and instructions executable by processor 110. For example, system memory 120 may include any of various types of random access memory (RAM), read-only memory (ROM), non-volatile memory (e.g., flash memory), magnetic memory, or any other suitable type of memory.

System memory 120 may be configured to store instructions and data that, when executed by processor 110 or another processor, are configured to implement an operating system 150 and virtualization module 160. Generally speaking, operating system 150 may correspond to any suitable type of operating system, such as a version of Microsoft Windows™, Apple MacOS™, Unix, Linux, or another operating system. Typically, operating system 150 may be configured to serve as an interface between applications and the resources provided by the computer system, such as memory, mass storage devices, communications devices, system services, and the like.

Virtualization module 160 may be configured to implement an environment within which multiple different virtual machines may operate. Virtualization module 160 may also be referred to as a hypervisor or a virtual machine monitor. In the illustrated embodiment, virtualization module 160 may be implemented as a distinct layer of software from operating system 150, a configuration that may be referred to as a "hosted hypervisor." In other embodiments, rather than running in a distinct layer, virtualization module 160 may be integrated with operating system 150 in a configuration that may be referred to as a "native hypervisor." Some examples of hosted-hypervisor implementations of virtualization module 160 may include VMware ESX/ESXi™, VMware Fusion™, Microsoft Virtual PC™, VirtualBox™, and Parallels Desktop™ Some examples of native-hypervisor implementations may include Xen, VMware Infrastructure™, Logical Domains Hypervisor™, and Parallels Server™. Other examples are possible and contemplated.

In the illustrated embodiment, virtualization module 160 is configured to implement a number of virtual machines 200*a-n*, as well as a virtual network 210, virtual storage 220, and a web services interface 230. Examples of each of these elements will be discussed in turn, it being noted that numerous variations and alternative configurations are possible. In various embodiments, various elements may be referred to using alternative terminology. For example, in the context of the Amazon Elastic Compute Cloud (EC2) service, individual virtual machines 200 may correspond to "instances," and the state of various virtual machines 200 (e.g., their applications, data, and configuration) may correspond to "Amazon Machine Images" or AMIs.

It is noted that processes that implement various virtualized elements such as virtual machines 200, virtual network 210, and virtual storage 220 may be configured to execute on different physical hardware than virtualization module 160 itself. For example, virtualization module 160 may be configured to employ remote procedure calls or other techniques to cause a process or thread corresponding to a particular virtual machine 200, or any other virtualized element, to be executed on a different physical system that possibly may have a different configuration than physical system 100.

Any number of virtual machines 200 may be deployed, depending on the resource capabilities of the underlying physical system 100 as well as virtualization module 160. Generally speaking, each of virtual machines 200 may be configured to host its own copy of an operating system and applications, which may execute independently of the other virtual machines 200. For example, FIG. 1 illustrates virtual machine 200*n* as including a virtual operating system 240 as well as one or more applications 245. Virtual operating system 240 may correspond to any suitable operating system, which may include any of the types of operating systems mentioned above with respect to operating system 150. Virtual operating system 240 may also be distinct from the underlying operating system 150 that executes on physical computer system 100. For example, virtual operating system 240 and operating system 150 may be completely different operating systems. Alternatively, they may correspond to the same type of operating system, but may each have distinct copies of data structures and/or executable code, and may be configured to execute separately from one another.

Each virtual machine 200 may be configured to operate as though it were an independent physical machine possessing those resources of physical system 100 that have been allocated to the virtual machine 200. For example, virtual machine 200a may be configured to execute a version of Microsoft Windows™ and one or more Windows applications, while virtual machine 200n may be configured to execute a version of Linux and one or more Linux applications. In some embodiments, the operating systems and applications executing on a given virtual machine 200 may be incapable of discerning that they are running in a virtual rather than a physical system. Thus, virtualization may be performed transparently with respect to each virtual machine 200.

Figure 2:
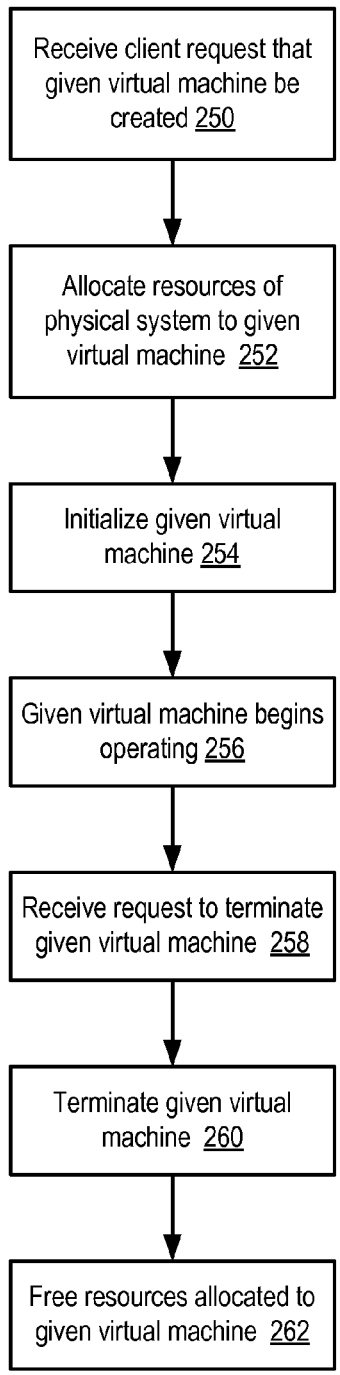
FIG. 2 illustrates an embodiment of a method of instantiating a virtual machine.

In various embodiments, virtualization module 160 may be configured to cause virtual machines 200a-n to be instantiated and destroyed in response to configuration requests received by virtualization module 160, e.g., from clients that may be external to physical system 100. As shown in the flow chart embodiment illustrated in FIG. 2, a client may request that a given virtual machine 200 be created (block 250). For example, the client may interact with a configuration interface presented by virtualization module 160 through web services interface 230 (discussed below), through a graphical user interface, or any other suitable type of interface. The client may correspond to a process executing on behalf of a user, either on physical system 100 or on a different system configured to communicate with physical system 100, e.g., via a network.

In various embodiments, the client's request may include configuration parameters for the requested given virtual machine 200. For example, the client may specify particular resources for the given virtual machine 200, such as an amount of memory, a particular level of processor performance, or the like. Alternatively, the client may specify a particular type or class of virtual machine 200 from among a set of available configurations. For example, virtualization module 160 may present generic "small," "medium," "large," and/or other types of virtual machine configurations for selection by the client, each having defined memory, performance, and/or other characteristics.

In some embodiments, the client's request may specify that the given virtual machine 200 should implement floating-point arithmetic entirely through software emulation, instead of employing hardware floating-point resources (such as a hardware floating-point unit accessible through ISA-defined floating-point instructions). For example, in some instances, the behavior of floating-point arithmetic emulated through the use of integer instructions may be more consistent across different hardware platforms than the behavior of floating-point arithmetic implemented using hardware resources. Similarly, in some embodiments, the client's request may specify that the given virtual machine 200 should disable specified advanced computing features, such as instruction set extensions (e.g., Streaming SIMD Extensions/SSE, SSE2, SSE3, SSE4, or other types of extensions for x86 or other ISAs). By restricting the use of such features, it may be possible to repeat the computation performed by given virtual machine 200 on a broader range of systems (e.g., on systems that do not implement the disabled features, and so could not repeat the computation if those features were relied upon).

In some embodiments, the client's request may also include information regarding how the state of the given virtual machine 200 should be initialized. For example, the request may specify the operating system 240 that should be booted, the application(s) 245 that should be available, and/or any data, libraries, or other inputs that may be needed to perform the client's computation. In various embodiments, the client may select initialization state from a number of options (e.g., may select from a list of available operating systems), may provide a detailed memory image reflecting the desired initial state of the given virtual machine 200 (e.g., reflecting executable code and/or data), or a combination of these or other techniques.

In response to a request to create or initialize a given virtual machine 200, virtualization module 160 may be configured to allocate resources of physical system 100 to the given virtual machine 200, such as by setting aside a certain amount of system memory 120 to be used by the given virtual machine 200 as its own virtual system memory (block 252). Virtualization module 160 may also initialize the given virtual machine 200 (block 254). For example, the given virtual machine 200 may be initialized according to the client's specification, or to a default state.

Once configured and initialized (which may occur concurrently or as part of the same operation), given virtual machine 200 may then begin operating (block 256). For example, operating system 240 may boot or resume from a previously defined state. Application(s) 245 may execute, either in an interactive fashion (i.e., receiving input from the client during operation) or autonomously. In various embodiments, as described below, virtualization module 160 may provide given virtual machine 200 with access to storage as well as a virtual network that may allow given virtual machine 200 to communicate with other virtual machines 200.

At some point, a request to terminate given virtual machine 200 may occur (block 258). For example, a client may initiate such a request when the task for which given virtual machine 200 was configured has completed, or for some other reason. Alternatively, virtualization module 160 may initiate such a request, for example in the event that the machine becomes unstable or violates some aspect of the client's terms of use. In response, given virtual machine 200 may be terminated (block 260) and its resources freed for use by other virtual machines (block 262). For example, virtualization module 160 may attempt to perform an orderly shutdown of given virtual machine 200 if possible. As described in further detail below, virtualization module 160 may archive or otherwise preserve the state of given virtual machine 200, information about its configuration within the virtual computing environment, and/or any other salient information. Once these or any other housekeeping tasks have completed, given virtual machine 200 may cease to exist as an entity.

In addition to providing for the configuration and operation of virtual machines 200, virtualization module 160 may be configured to provide for virtualized network connectivity among virtual machines 200 via virtual network 210. For example, virtual network 210 may be configured to emulate a local area network (LAN) or any other suitable type or topology of network. Through virtual network 210, virtual machines 200 may be configured to communicate with one another as though they were physical machines connected to a physical network.

In some embodiments, virtualization module 160 may be configured to bridge virtual networks implemented on different physical systems in order to implement virtual networks of large scale. For example, virtual machines 200 implemented on distinct physical systems 100 may nonetheless be able to communicate with one another as part of the same general virtual network 210. In such embodiments, different instances of virtualization module 160 may be configured to communicate information with one another via a physical network connecting their respective physical systems 100 in order to implement virtual network communication among their virtual machines 200.

Virtualization module 160 may also be configured to provide virtual machines 200 with access to mass storage, shown as virtual storage 220. For example, virtual storage 220 may be configured as a block storage device (e.g., a logical storage volume), a file system, a database, or any other suitable type of mass storage that may be presented to a computer system. Embodiments of virtual storage 220 may also be referred to generically as mass storage resources. In some embodiments, virtual storage 220 may be implemented as a virtual network-connected device accessible to virtual machines 200 via virtual network 210. For example, virtual storage 220 may be configured as a virtualized network attached storage (NAS) device, as a virtualized storage area network (SAN), as a storage service accessible through Internet protocols (e.g., as a web-services-based storage service), or in any other suitable fashion. In some embodiments, virtual storage 220 may be implemented via a service such as Amazon Elastic Block Store (EBS), Amazon Simple Storage Service (S3), or via another suitable storage service model.

In some embodiments, management of virtual storage 220 may be handled by virtualization module 160 directly. For example, virtualization module 160 may include the functionality necessary to implement a virtualized volume server, file server, or other type of mass storage architecture. In other embodiments, virtualization module 160 may instead provide interfaces through which virtual machines 200 may access storage that exists and is managed externally to virtualization module 160. For example, some other software component executing on physical system 100 or another system may be configured to provide mass storage as well as an application programming interface (API) through which to access storage. Virtualization module 160 may then be configured to pass storage access requests from virtual machines 200 to this external API.

Virtualization module 160 may be configured to support a number of different types of interfaces through which a client may interact with a particular virtual machine 200. For example, virtualization module 160 may be configured to perform basic terminal emulation to allow a client to provide textual input to virtual machines 200 and to return textual output for display to the client. In cases where a given virtual machine 200 supports more sophisticated user interfaces, such as windowing systems or other types of graphical user interfaces (GUIs) that may be hosted by software executing within given virtual machine 200, virtualization module 160 may be configured to pass input from the client's input devices (e.g., keyboard, pointing device, etc.) to given virtual machine 200 and to pass graphical output to the client.

In some embodiments, virtualized computing may be offered as an on-demand, paid service to clients, such as the Amazon EC2 service mentioned above. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources. Generally speaking, to provide virtualized computing services to clients, virtualization module 160 may be configured to present a virtualized computing service API to clients, through which the clients may submit various types of requests for virtualized computing services. For example, as described in greater detail below, clients may submit requests via the virtualized computing service API for virtualized computing resources to be instantiated, initialized, and/or deleted. Clients may also submit requests for various computations to be performed by virtualized computing resources.

In the embodiment illustrated in FIG. 1, virtualization module 160 may be configured to present virtualized computing resources such as virtual machines 200 to clients as part of a web service via web services interface 230. Generally speaking, a web service may refer to computing functionality that is made available to clients through calls made by clients to one or more web services endpoints, where the web services endpoints are addressable by the clients according to an application-level, Internet-based transport protocol, such as the Hypertext Transfer Protocol (HTTP). For example, a web services endpoint may implement a particular API that defines the web services operations that clients may request. In some embodiments, web services interface 230 may be configured to implement the addressable web services endpoint(s), and may include functionality configured to receive and send web services request and response information with respect to clients.

To request that the web service perform a particular operation, clients may format the request in the manner specified by the API and convey the request to the addressable endpoint. For example, the endpoint may be addressable according to a Uniform Resource Indicator (URI) of the form "endpoint.domainname.toplevel" such as, e.g., virtualcomputing.company.com. Alternatively, the endpoint may be addressable according to a numeric-form address such as, e.g., an IP address.

In various embodiments, web services interface 230 may be configured to be invoked by clients in any of a number of suitable ways. For example, web services interface 230 may be configured to implement a Representational State Transfer (REST)-style web services architecture. Generally speaking, in a REST architecture, the requested web services operation and its various parameters may be appended to the web services call that is made to the web services endpoint according to the transport protocol. For example, the details of the requested operation may be included as parameters of an HTTP request method such as GET, PUT, or POST. Alternatively, web services interface 230 may be configured to implement a document- or message-oriented architecture. For example, the details of the requested operation may be formatted by the client as an eXtensible Markup Language (XML) document and encapsulated using a version of the Simple Object Access Protocol (SOAP). Upon receiving such a document, web services interface 230 may be configured to extract the details of the requested web services operation and attempt to perform the operation.

In the context of virtualized computing as a web service, it is contemplated that the API implemented by web services interface 230 may support any or all of the types of operations made available to clients by virtualization module 160. For example, the API may support the configuration, initialization, and termination of virtual machines 200 as discussed above with respect to FIG. 2. Additionally, in some embodiments, the API may support the exchange of input and output (textual, graphical, audio, or otherwise) between the client and virtual machines 200 or other virtualized resources.

Repeatable Virtualized Computing

It is noted that in virtualized computing environments such as the one illustrated in FIG. 1, there exists a layer of functionality between virtual machines 200 and the physical system 100 on which the virtual machines execute: that is, the functionality of virtualization module 160 that organizes physical system resources into virtual machines 200. Thus, even though virtual machines 200 may behave like physical machines from the perspective of the code they execute, they may differ from physical machines in that virtualization module 160 may have detailed information about the configuration, internal state, and input/output (I/O) activity of each virtual machine 200.

That is, virtual machines 200 may exist entirely within a computing environment generated by virtualization module 160, such that any detail regarding information crossing the I/O boundary of a virtual machine 200 (and in some embodiments, any detail regarding the internal state of a virtual machine 200) may be observable by virtualization module 160. For example, if a virtual machine 200 conducts I/O operations (e.g., to send or receive network data, data from peripheral devices, etc.), these operations may be processed by virtualization module 160 before being conveyed to another virtual entity or a physical entity outside the virtualization environment. Likewise, as noted above with respect to FIG. 2, virtualization module 160 may be aware of the parameters with which virtual machines 200 were configured, and may be capable of monitoring and logging the internal and/or I/O state of virtual machines 200 during their operation.

Figure 3:
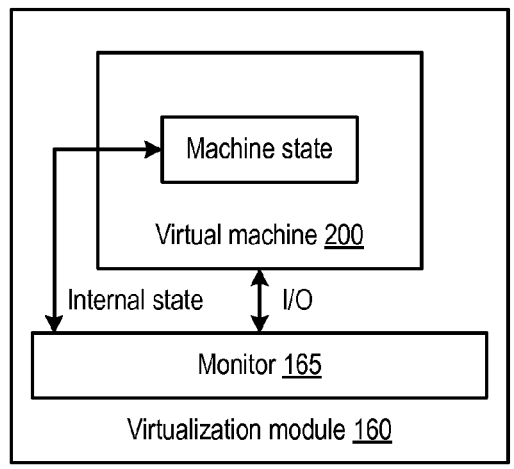
FIG. 3 illustrates an embodiment of a virtualization module.

For example, as shown in FIG. 3, an embodiment of virtualization module 160 may include a monitor 165, which may be implemented as a routine, module, or any other suitable construct. In some embodiments, monitor 165 may be configured to coordinate and log I/O activity occurring with respect to virtual machine 200. Monitor 165 may further be configured to monitor and log aspects of the internal machine state of virtual machine 200, which may include memory images or any other state-bearing element of virtual machine 200.

By contrast, in a typical physical system that does not support virtualization, there may not exist any single entity or vantage point from which it is possible to observe the entire I/O boundary or internal state of the physical system. Thus, a virtualization environment may allow significantly greater access to the configuration and operating state details of a machine that executes operating system and application code than would otherwise be available.

The broad visibility into virtual machine state that is afforded by virtualization may facilitate the implementation of repeatable computing operations. As indicated above, reliable reproduction of results may depend on the degree to which the computing environment at the time of reproduction differs from the environment at the time the results were originally generated, because even minor differences in compilers, libraries, hardware, or other factors may impede repeatability. Correspondingly, it may be desirable to preserve as much information as possible about the original configuration of the computing environment, and to recreate this configuration as faithfully as possible (or with more relaxed fidelity, if this is acceptable to the client) at the time the computation is repeated.

In some embodiments, virtualization module 160 may be configured to assist with both of these tasks. For example, when a client desires to perform a repeatable computation, virtualization module 160 may be configured to archive information describing the initial state and configuration of the virtual machine(s) 200 that will perform the computation as well as any inputs to be provided during computation, and to archive the terminal state of the virtual machine(s) 200 once the repeatable computation has terminated. Subsequently, to repeat the repeatable computation, virtualization module 160 may be configured to initialize the virtual machine(s) 200 according to the archived initial state, supply the archived inputs (if any), initiate the computation, and compare the terminal state of the repeated computation against the archived terminal state of the original computation to determine whether the two versions of terminal state match.

Figure 4:
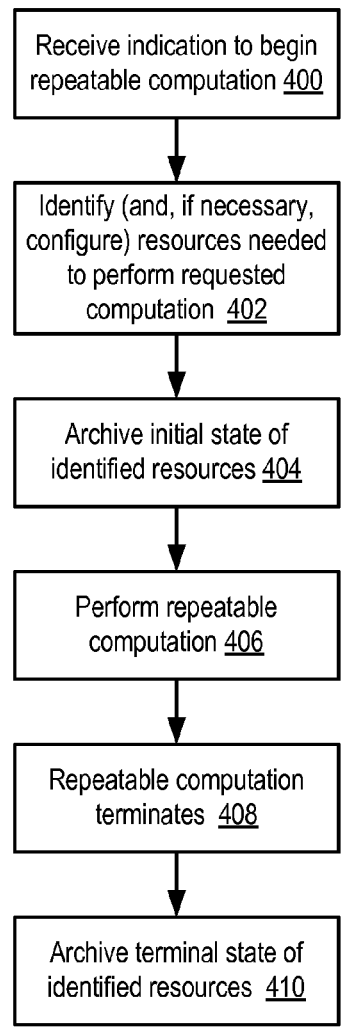
FIG. 4 illustrates an embodiment of a method of performing a repeatable computation.

An embodiment of a method of performing a repeatable virtualized computation is shown in the flowchart of FIG. 4. Operation begins in block 400 where an indication to begin a repeatable computation is received. For example, when requesting that a virtual machine 200 be created or initialized, via web services interface 230 or otherwise, a client might specify that the virtual machine 200 should be configured for repeatable computing. In some embodiments, a client may request a repeatable computation with respect to resources that are already configured. For example, a client might use a configured virtual machine 200 for some period of time before requesting that the configured virtual machine 200 perform a repeatable computation.

The resources needed to perform the requested computation are then identified and, if necessary, configured for use (block 402). For example, a client may specify the number of virtual machines 200 that are desired, how they are to be configured (e.g., with respect to memory, performance, or other characteristics). The client may further specify other resources that are to be used and their characteristics, such as virtual network 210 and virtual storage 220, or any other resources that may be defined within the environment managed by virtualization module 160. In some embodiments, the client may identify the resources in detail, while in other embodiments, the client may simply identify a particular predefined configuration for some or all resources, and virtualization module 160 may be configured to identify the particular resources that correspond to the selected configuration.

For example, in the context of the Amazon EC2 virtualized computing service, a client might identify a number of instances and their types (e.g., small, large, extra large, high-memory, high-CPU), which may correspondingly identify the requested virtual machines 200 and their configurations (e.g., amount of memory, amount of compute power, amount of virtual storage, and/or other relevant parameters). The client may also specify the AMI (machine image) for the various instances, and may identify any other mass storage devices (e.g., EBS volumes or other types of storage) that are to be used. In some instances, a client might specify the configurations of virtual resources with a greater level of detail. For example, the client might specify a particular processor architecture, manufacturer, or processor model to be used as the basis for a virtual machine 200. Alternatively, a client might be less sensitive as to the particular details of a configuration, but more concerned that the configuration details be reproducible with a high degree of fidelity. For example, the client might not specify processor configuration details, but might request that the details of whatever hardware is ultimately assigned to the client be recorded in detail so that on a later occasion, the initial configuration can be reproduced.

The initial state of the identified resources is archived (block 404). For example, virtualization module 160 may be configured to store information describing how the various virtual machines 200 and other resources to be used are configured, such as a list of virtual machines 200 along with parameters supplied or implied by the client, the configuration of virtual network 210 (if applicable), a list of the volumes of virtual storage 220 identified by the client, and/or any other configuration information. Virtualization module 160 may also be configured to store initial client-supplied state (e.g., a machine image or memory image specifying operating system code, application code, and data to be used) as well as any client-supplied inputs for the repeatable computation. In various embodiments, a machine image or memory image may be represented as a completely-specified or sparselypopulated map of a virtual machine's address space, indicating what data is located at which addresses.

To archive the initial state, virtualization module 160 may be configured to store the state data to any suitable type of storage system according to any suitable format or organization. For example, in various embodiments, physical system 100 may have access to local or networked storage devices that are available for use by virtualization module 160. Alternatively, virtualization module 160 may be configured to employ a web services-based storage service (e.g., Amazon's S3) for archival purposes.

In some embodiments, the archived initial state may also include information about physical system 100 that may not normally be visible to virtualization clients. For example, in a virtualization system, clients may typically be more concerned with the effective configuration and behavior of their virtual machines 200 than with the details of the underlying hardware and software that implement those machines. However, as noted above, repeatability may be influenced by such underlying details. Correspondingly, in some embodiments, virtualization software 160 may be configured to archive details about the hardware configuration of physical system 100 (e.g., information identifying processor 110 and/or other system components) as well as details about its software configuration (e.g., information identifying the type and version of operating system 150, virtualization software 160, and/or other components such as libraries, drivers, etc.).

Figure 5A:
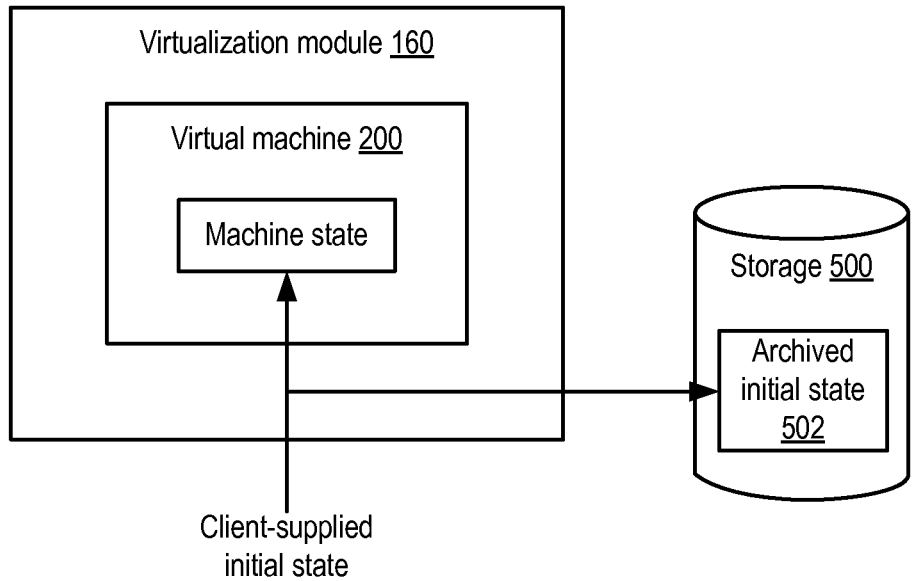
FIGS. 5A-B illustrate embodiments of the archival of initial and terminal state of a repeatable computation.

An example system configuration illustrating the archival of initial state is shown in FIG. 5A. In the illustrated embodiment, client-supplied initial state including initial state of a virtual machine 200 may be supplied to virtualization module 160. Virtualization module 160 may accordingly initialize the virtual machine 200, and may also store the initial state within storage 500 as archived initial state 502. In various embodiments, storage 500 may correspond to any suitable physical, logical, or virtual device or medium configured for data storage. It is noted that archived initial state 502 may include initial state for elements other than virtual machine 200, such as virtual network 210 and virtual storage 220, though for simplicity, these are not shown in FIG. 5A.

The repeatable computation is then performed (block 406). For example, the requested virtual machine(s) 200 and their associated executable code may be launched and may execute in their usual fashion (i.e., as they might execute on a similar physical system). In some embodiments, the repeatable computation may receive inputs from external sources during operation (e.g., inputs not specified as part of the initial state). For example, the client might supply input from a mouse, keyboard, or other device, or a given virtual machine 200 may communicate with other virtual machines 200 or with other devices external to the virtualization environment. In some embodiments, virtualization module 160 may be configured to archive inputs and outputs that may occur during the course of the repeatable computation along with other archived state.

At some point, the repeatable computation terminates (block 408). For example, termination may occur upon notification by the client, upon the occurrence of some client-defined event (e.g., the termination of a particular application 245), or according to some other circumstance.

After termination of the repeatable computation, the terminal state of the identified resources is archived (block 410). Generally speaking, the terminal state may include any aspect of the state of the system that was subject to modification during the repeatable computation. For example, the terminal state may include the state of virtual machines 200, of virtual storage 220, and/or any other relevant state information. Correspondingly, virtualization module 160 may be configured to dump system images of virtual machines 200, take snapshots of storage volumes, etc. In various embodiments, the terminal state may or may not include information identifying how the virtual or physical system resources were configured. That is, the terminal state may or may not encompass all of the elements of the initial state discussed above.

It is noted that in some embodiments, resource state may be archived at checkpoints or intervals, rather than only once after the repeatable computation terminates. For example, "snapshots" of resource state may be taken at intervals measured in terms of elapsed time, events generated by the computation, or other suitable points in time. (In typical cases, where only a small amount of the resource state is expected to change in between snapshots, sparse data structure techniques may be employed to minimize the amount of storage needed to store the set of all resource state snapshots.) In some such embodiments, the terminal state may be understood to encompass the entire set of archived state generated during the course of the repeatable computation, including the interim state generated at the checkpoints or intervals.

Figure 5B:
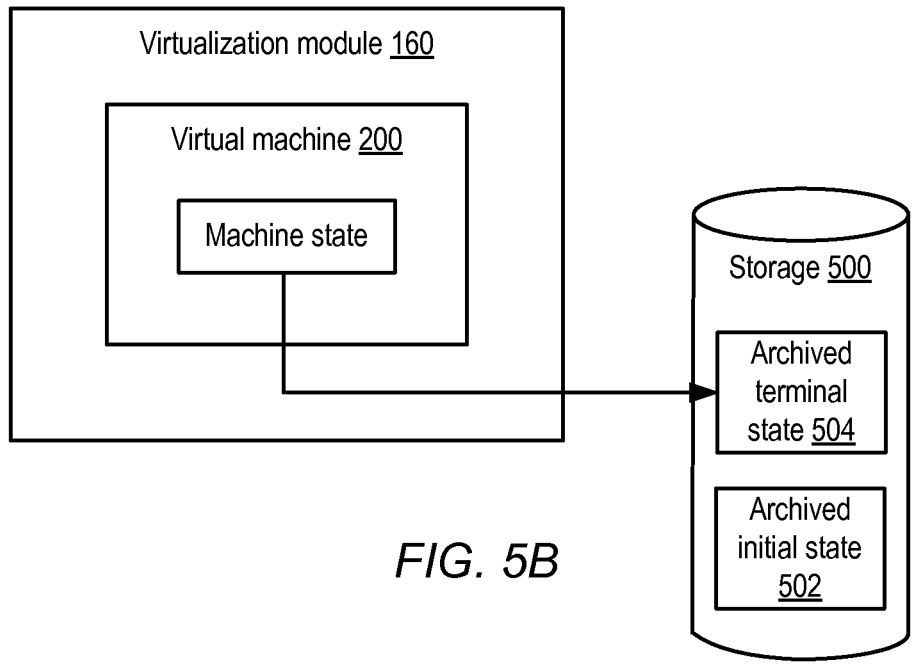

An example system configuration illustrating the archival of terminal state is shown in FIG. 5B. In the illustrated embodiment, virtualization module 160 may be configured to capture the state of virtual machine 200 within storage 500 as terminal state 504. Virtualization module may also be configured to copy the state of other elements for storage within terminal state 504, such as virtual network 210 and/or virtual storage 220 (not shown in FIG. 5B).

At some time after the original repeatable computation has completed, a client may request that the computation be repeated and validated against the original. In some embodiments, the process for repeating a repeatable computation may resemble the process described above for generating and archiving the original results, except that instead of receiving configuration information and input data from the client, the archived versions of this information may be used to configure, initialize, and run the virtual machine(s) 200.

Figure 6:
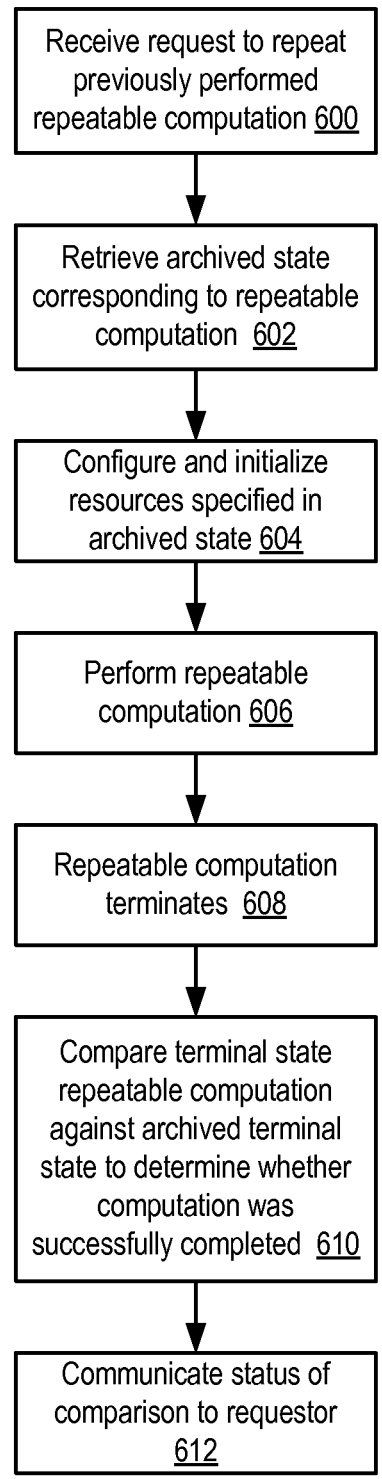
FIG. 6 illustrates an embodiment of a method of repeating a repeatable computation.

FIG. 6 illustrates an example embodiment of a method of repeating a repeatable computation. In the illustrated embodiment, operation begins in block 600 where a request to repeat a previously performed repeatable computation is received. For example, the client that made the original request may also make the request to repeat, although the requesting entities may differ in other situations. In some embodiments, after a repeatable computation is initially performed, it may be repeated without an explicit request by the client. For example, it may be desirable to verify that a repeatable computation is in fact repeatable shortly after the computation is initially performed (and thus provide some degree of confidence that the repeatable computation should be repeatable at a later time). Correspondingly, in some cases, some or all of the actions shown in FIG. 6 may be performed as part of the process shown in FIG. 4, as a way of validating the repeatable computation and detecting any possible problems at an early stage of the life of the computation. For example, after the original terminal state is generated, the various actions shown in FIG. 6 may be performed to generate a test terminal state of the repeatable computation. The test terminal state may be similar to the new terminal state described below, except that it may be generated in the course of initially performing the repeatable computation rather than in response to a client request to subsequently repeat the repeatable computation.

The archived state corresponding to the repeatable computation may then be retrieved (block 602). For example, virtualization module 160 may be configured to assign unique identifiers to repeatable computations and to map these identifiers to locations of corresponding archived data. When a client specifies a particular unique identifier, virtualization module 160 may be configured to retrieve the corresponding state information, for example by retrieving archived initial state 502 and archived terminal state 504 from storage 500.

The virtualized computing resources specified in the archived state may then be configured and initialized (block 604). For example, virtualization module 160 may be configured to instantiate virtual machine(s) 200, virtual network(s) 210, virtual storage 220, and/or any other resources identified in the configuration information previously stored in the archived state. Virtualization module 160 may also be configured to initialize these resources according to the archived state. For example, if the archived state includes a memory image for a particular virtual machine 200, virtualization module 160 may use this memory image as the initialized state for the newly instantiated version of the particular virtual machine 200.

In embodiments where information about underlying physical resources is also present within the archived state, virtualization module 160 may also attempt to use this information. For example, if archived state information indicates that a particular type of processor 110 or physical system 100 was used, virtualization module 160 may attempt to assign processes that implement virtual machine(s) 200 to execute on the indicated physical hardware, if it is available.

After being initialized from the archived state, the repeatable computation is then performed (block 606). For example, the virtual machine(s) 200 and their associated executable code, as identified within the archived initial state information, may be launched and may execute in their usual fashion. In embodiments where inputs were captured during the course of the original computation (e.g., inputs from peripheral devices, network traffic, etc.), the archived versions of these inputs may be supplied as inputs during the repeatable computation.

In some embodiments, the repeatable computation may receive inputs from external sources during operation (e.g., inputs not specified as part of the initial state). For example, the client might supply input from a mouse, keyboard, or other device, or a given virtual machine 200 may communicate with other virtual machines 200 or with other devices external to the virtualization environment. In some embodiments, virtualization module 160 may be configured to archive inputs and outputs that may occur during the course of the repeatable computation along with other archived state.

The repeatable computation eventually terminates (block 608). For example, the repeatable computation may terminate under any of the same conditions noted above with respect to its original execution. The terminal state of the repeatable computation is compared against the archived terminal state to determine whether the repeatable computation was successfully repeated (block 610), and the status of the comparison (e.g., success or failure) is communicated to the requestor (block 612).

In various embodiments, the criteria for determining what constitutes a successful repeated computation may be supplied by the client. For example, a client may indicate that the success criterion requires that the newly generated state of virtual machine(s) 200 and virtual storage 220 exactly match the archived terminal state of these elements from the original computation (e.g., the state of all memory address spaces, virtual processor state, and virtual storage blocks must match). In other cases, a client may indicate only that only a portion of the total state needs to match archived terminal state. For example, repeatability may be satisfied if the same values are generated for a defined set of result variables stored in memory rather than an entire memory address space. Correspondingly, a client may identify and require a comparison with respect to only certain regions of memory, certain files or regions of storage, and/or portions of other state. In such an embodiment, mismatches between newly generated state and archived terminal state that occur outside the specified portions of state to be considered may not affect the overall determination of successful repetition.

The success criterion may also make use of hash functions. Generally speaking, a hash function may correspond to any function configured to reduce a large, possibly variable-size portion of input data to a smaller, usually fixed-size output. Hash functions may include checksums, cryptographic hash algorithms (e.g., MD5, Secure Hash Algorithm (SHA), or other types of cryptographic hashes), fingerprint algorithms, or other suitable functions. In some embodiments, instead of determining whether all or a portion of the original and new terminal state match, a hash function may be separately applied to all or a relevant portion of the original terminal state, and all or a relevant portion of the new terminal state. The outputs of the hash functions as applied to the two versions of terminal state may then be compared, and success may be determined on the basis of whether or not these outputs (rather than the terminal state itself) match. In some instances, employing hash functions may reduce the amount of time required to determine successful repetition. For example, if the original terminal state is hashed when the repeatable computation is originally performed, then following an attempt to repeat the computation, it may be necessary only to hash the new terminal state rather than compare the entirety of the original and new terminal states.

As noted above, during the original performance of the repeatable computation, the original terminal state may include interim state stored at checkpoints or intervals during the computation. Similarly, when the repeatable computation is repeated, the new terminal state may include a similar set of interim state stored at analogous checkpoint or intervals during the repeated computation. In some embodiments, the process of determining whether the computation has been successfully repeated may include comparing the original and new terminal state at some or all of the checkpoints. For example, if N checkpoints had been generated, then N discrete sets of original and new terminal state may be compared. In some embodiments, the degree of successful repetition may be determined according to the number of checkpoints that were successfully compared. For example, instead of success being defined in binary terms (e.g., success or failure), success may be reported along a continuum (e.g., 10% success of 10% of checkpoints matched, 90% success if 90% of checkpoints matched, or some other function).

In general, the degree to which a computation may be successfully repeated may depend on the degree to which variability in factors affecting the computation can be controlled, as between the original computation and the attempted repetition of that computation. For example, as discussed above, variations in the initial configuration and state of a virtual machine 200 may be controlled by archiving these details, and then recreating and restoring a new virtual machine 200 to be consistent with the archived state.

Another source of variability that may affect computational repeatability is the nature of the inputs provided to the computation. For example, in one instance, a computation might be dependent solely on static, self-contained data, such that the computation might be implemented entirely by a single virtual machine 200 (possibly in conjunction with virtual storage 220), and without dependence upon performing I/O with respect to other virtual machines 200 or other entities. In such a situation, repeating the computation may be simply a matter of configuring the single virtual machine 200, initializing its state, initiating the computation, and waiting for it to complete—coordination of I/O to the computation other than mass storage I/O may be unnecessary. Such a computation may exhibit little sensitivity to input variability, because the inputs can be defined and initialized at a single point in time.

By contrast, a networked computation that depends upon inputs that are outside the control of the virtualization system may be more sensitive to input variability. For example, during a computation, a virtual machine 200 may exchange data with a remote computer system (e.g., via the Internet, a LAN, or other network). However, if the computation is repeated, the communication behavior of the remote system may differ from its prior behavior. For example, the remote system may be unavailable, or the network between the virtual machine 200 and the remote system may deliver packets with a different latency or in a different order. Any of these differences may introduce nondeterministic variability into the computation that may cause its terminal state to differ from the original computation.

In some embodiments, virtualization module 160 may be configured to offer various input-handling options to clients performing repeatable computing. For example, when requesting that a repeatable computation be performed, a client may specify that the computation be run in a limited I/O mode, which may also be referred to as a "strict" or "mandatory" mode. In some embodiments, when this mode of operation is requested, virtualization module 160 may be configured to prevent any external I/O (e.g., I/O that crosses the boundary of virtualization module 160) from occurring with respect to virtualized resources such as virtual machines 200.

For example, when a particular virtual machine 200 is configured in this limited I/O mode of operation, virtualization module 160 may prevent external network data or peripheral data (e.g., mouse or keyboard data) from being input to the particular virtual machine 200, e.g., by intercepting and discarding such data. (In some embodiments, input data from virtual storage 220 may still be allowed in this mode.)

Generally speaking, enforcing strong limitations on the I/O that may occur during a computation may increase the likelihood that the computation will be successfully repeated. Such limitations may have the effect of containing or encapsulating the computation, in that by limiting external, possibly nondeterministic influences on the computation's state, a strong boundary around that state can be defined. For example, if no I/O is allowed to occur during operation of a virtual machine 220, then the behavior of that virtual machine 220 will be largely or entirely defined by its initial state. Such limitations on I/O may limit a client's flexibility in terms of the types of computations that may be performed. However, such limitations may also simplify the client's burden of initializing and performing a repeatable computation, in that the client need not account for (and attempt to control) external influences.

By contrast, in some instances, a client may not want to limit I/O as stringently as described above. For example, the client's application may be a networked application that is specifically tailored to be run in a networked environment using multiple distinct machines. In some embodiments, the client may have several options. In one scenario, if the client's application can be entirely implemented within the virtualization domain managed by virtualization module 160 (e.g., it can be mapped to a set of virtual machines 200 that may communicate via virtual network 210), then virtualization module 160 may be configured to log and archive the I/O occurring between the virtual resources, thus preserving the repeatability of this I/O.

Alternatively, the client may request that the computation be run in a relaxed I/O mode of operation, which may also be referred to as an "advisory" mode. In some embodiments, when this relaxed mode of operation is requested, virtualization module 160 may be configured to allow external I/O (e.g., I/O that crosses the boundary of virtualization module 160, such as network accesses to external resources) for virtualized resources such as virtual machines 200. For example, in this relaxed I/O mode of operation, a virtual machine 200 may be permitted to interact with a resource that is outside the virtualization domain controlled by virtualization module 160, such as an external web service or other resource external to physical system 100.

Relaxed I/O constraints may broaden the types of computations a client may perform. However, such relaxed I/O constraints may also introduce the possibility of nondeterminism, which may affect the repeatability of a computation. For example, as noted above, attempts to repeat external I/O may result in different latencies or different response ordering than during the original computation, which may influence the terminal state of the computation.

The client may choose to accept the burden of this nondeterminism in exchange for the flexibility afforded by the relaxed I/O constraints. For example, the client may attempt to control or coordinate the external resources to ensure that they produce consistent results across different invocations of a repeatable computation. The client may also attempt to define the criteria for successful repetition in a manner that is insensitive to the potential effects of nondeterminism. For example, instead of requiring that the entire terminal state of a virtual machine 200 match archived terminal state, the client may require only that certain values match (e.g., values corresponding to particular memory locations, machine registers, particular files in the file system or logical blocks within a block device, etc.). If possible, the client may then organize the computation to produce those values in a manner that is robust with respect to the effects of I/O ordering and latency.

Thus, by choosing the degree to which computation inputs are restricted from among options implemented by virtualization module 160, a client may effectively choose the degree to which repeatability of a computation may be achieved. Additionally, as mentioned above, a client may also control many aspects of the configuration and initialization of virtualized resources by providing appropriate inputs to virtualization module 160.

It is contemplated that in some embodiments, a customer may configure only some virtualized resources for repeatable computing. For example, a client may request that multiple different virtual machines 200 be instantiated and configured by virtualization module 160, but may specify that only a proper subset (i.e., fewer than all) of the different virtual machines 200 be configured for repeatable computing. Correspondingly, the repeatable computing techniques described above (e.g., with respect to archiving and restoring initial and terminal state) may only be performed with respect to the virtual machines 200 that are configured for repeatable computing. The remaining virtual machines 200 may be configured operate without taking any particular measures to ensure the repeatability of their results.

As noted above with respect to FIGS. 4 and 6, in some embodiments, virtualization module 160 may be configured to include configuration information about physical system 100 when archiving the initial state of a repeatable computation. Correspondingly, when preparing to repeat the repeatable computation, virtualization module 160 may attempt to assign processes that implement the repeatable computation to underlying hardware and software that have the same characteristics as physical system 100.

As part of a virtualization service offered to clients using a system like that shown in FIG. 1, clients may be offered a guarantee that their repeatable computations will be supported for some length of time (e.g., a period of years), or indefinitely. For example, an enterprise may offer repeatable virtualized computing services for a fee, and might charge a higher fee for a longer guarantee period. To support the guarantee, the enterprise may need to ensure that the computational infrastructure (i.e., hardware and software) used by a client remains available for the duration of the guarantee.

To facilitate retention of this infrastructure, in some embodiments, the enterprise may maintain different classes of infrastructure. A particular one of the classes may be specifically associated with repeatable computing, and the enterprise may direct all client requests for repeatable computing to the particular class. Systems included in the particular class may have the same configuration for the purposes of repeatable computing (i.e., they may differ in ways that do not affect computational results), and this configuration may be preserved over time. By contrast, systems included in other classes may be upgraded or altered as the enterprise deems appropriate. By defining a particular, uniform class of computational infrastructure for repeatable computing, the enterprise may simplify retention of this infrastructure relative to embodiments where repeatable computations are allowed to execute on a variety of infrastructure configurations.

It is contemplated that in some embodiments, a repeatable computation may be deliberately performed on different infrastructure than what was used during its original execution. For example, when deploying a new infrastructure, such as a new system configuration for virtualized computing, it may be desirable to ascertain whether the new infrastructure behaves in the same way as a prior infrastructure. One way to make this determination is to identify a computation that exercises aspects of the infrastructure that may be sensitive to configuration changes. Such a computation, which may also be referred to as an acceptance suite, might include a number of different applications configured to perform different aspects of the computation. For example, as noted above, high-precision arithmetic may exhibit subtle changes when run using different hardware or software. Correspondingly, an acceptance suite might include a number of routines configured to test arithmetic operations using different numerical data patterns. These operations may be tested under various conditions chosen to expose differences, if they are present.

Once developed, an acceptance suite may be run on an existing infrastructure to generate a baseline set of data. In some embodiments, the acceptance suite may be run as a repeatable computation using the techniques described above, e.g., with respect to FIG. 4. The acceptance suite may then be repeated on the new infrastructure using the archived initial and terminal state from the existing infrastructure using the techniques described above, e.g., with respect to FIG. 6. If the behavior of the new infrastructure matches that of the existing infrastructure (e.g., according to a comparison of terminal state under whatever criteria are specified by the acceptance suite), then the new infrastructure may be considered functionally equivalent to the existing infrastructure, at least with respect to the aspects of the infrastructure that are exercised by the acceptance suite. If the different infrastructures' behavior diverges with respect to the acceptance suite, then the new infrastructure may be rejected, or at least avoided for use with repeatable computations that depend on the existing infrastructure.

The techniques and illustrations described above are intended to serve as possible examples, and numerous variations are possible and contemplated. It is noted that in various embodiments, any of the various techniques or actions that have been ascribed to virtualization module 160, operating system 150, virtualized operating system 240, or applications 245 may be performed by executable instructions, firmware, or hardware according to different organizations than those described above and illustrated in the drawings. For example, virtualization module 160 may be partitioned into different components that implement different aspects of the techniques described above (e.g., aspects related to virtualization and managing repeatable computation may be implemented in separate modules). Aspects of virtualization module 160 may be implemented within operating system 150, or vice versa. Further, it is noted that some or all of the functionality ascribed to any of the components described or shown may be implemented using dedicated hardware devices, executable program instructions, firmware, microcode, or any other suitable implementation technique or combination of techniques.

Example Computer System Embodiment

It is contemplated that in some embodiments, any of the methods, techniques or components described above may be implemented as instructions and data capable of being stored or conveyed via a computer-accessible medium. Such methods or techniques may include, for example and without limitation, the various methods of configuring and initializing virtual machines 200 and performing and repeating repeatable computations as performed by the elements and methods described above and shown in FIGS. 1-6, or suitable variations of such elements and methods. Such instructions may be executed to perform specific computational functions tailored to specific purposes (e.g., processing web services traffic, performing high-precision numerical arithmetic, etc.) as well as higher-order functions such as operating system functionality, virtualization functionality, network communications functionality, application functionality, and/or any other suitable functions.

Figure 7:
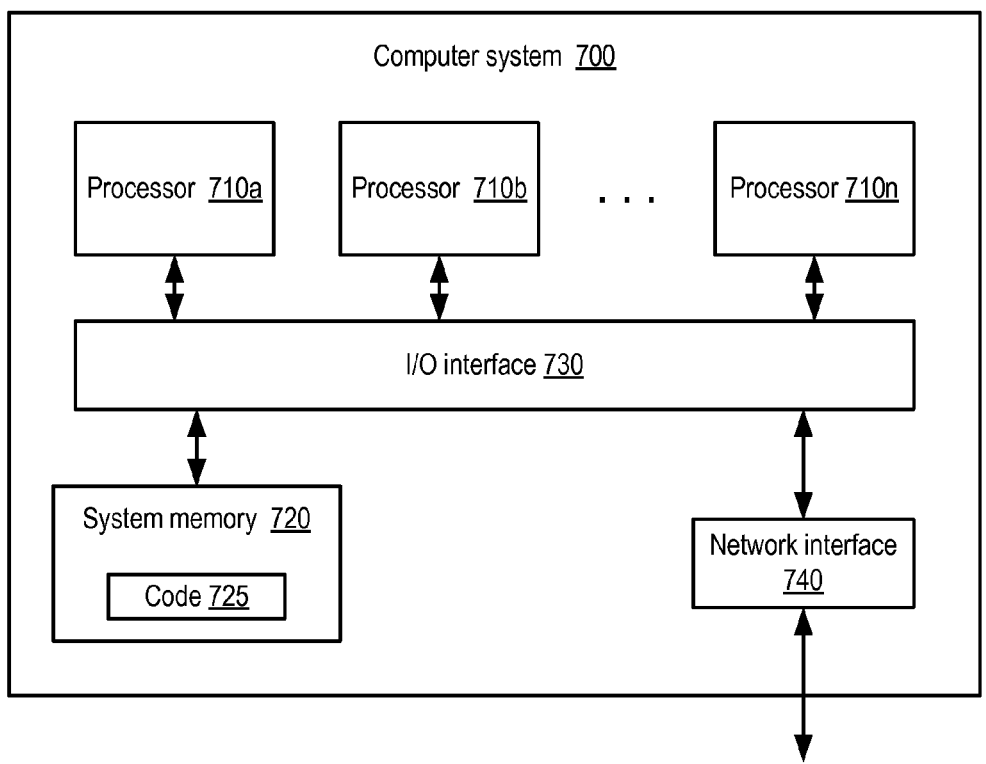
FIG. 7 illustrates an embodiment of a computer system.

One example embodiment of a computer system including computer-accessible media is illustrated in FIG. 7. Computer system 700 may correspond to an example configuration of physical computer system 100 shown in FIG. 1. Correspondingly, in various embodiments, the functionality of any of the various modules or methods described above (e.g., as provided by operating system 150, virtualization module 160, virtual machines 200, and/or other elements described above) may be implemented by one or several instances of computer system 700. In particular, it is noted that different elements of the system shown in FIG. 1 may be implemented by different computer systems 700. For example, virtualization module 160 may be implemented on one computer system 700 while virtual machines 200 may execute on a different computer system 700 under the control of virtualization module 160.

In the illustrated embodiment, computer system 700 includes one or more processors 710 coupled to a system memory 720 via an input/output (I/O) interface 730. Computer system 700 further includes a network interface 740 coupled to I/O interface 730. In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 720 as code 725. It is noted that in some embodiments, code 725 may include instructions and data implementing desired functions that are not directly executable by processor 710 but are represented or encoded in an abstract form that is translatable to instructions that are directly executable by processor 710. For example, code 725 may include instructions specified in an ISA that may be emulated by processor 710, or by other code 725 executable on processor 710. Alternatively, code 725 may include instructions, procedures or statements implemented in an abstract programming language that may be compiled or interpreted in the course of execution. As non-limiting examples, code 725 may include code specified in a procedural or object-oriented programming language such as C or C++, a scripting language such as perl, a markup language such as HTML or XML, or any other suitable language.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to network 120, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 720 may be one embodiment of a computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 700 via I/O interface 730. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 700 as system memory 720 or another type of memory. A computer-accessible storage medium may generally be accessible via transmission media or signals such as electrical, electromagnetic, or digital signals, conveyed via a communication medium such as a network and/or a wireless link, such as may be implemented via network interface 740.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a processor; and
a memory coupled to the processor, wherein the memory is configured to store instructions executable by the processor to:
in response to a client request to initially perform a computation that has been identified as a repeatable computation:
generate an original initial machine image of an original computing environment associated with an original system state of the repeatable computation,
store the original initial machine image on a computer-readable storage medium,
instruct that the repeatable computation be performed on the original computing environment to generate an original terminal state of the repeatable computation,
generate an original terminal machine image of the original computing environment, wherein the original terminal machine image includes at least a portion of the original terminal state of the repeatable computation, and
store the original terminal machine image on the computer-readable storage medium;
in response to a client request to repeat the repeatable computation:
restore the original computing environment as a restored computing environment based at least in part upon the original initial machine image, and
instruct that the repeatable computation be performed on the restored computing environment to generate a new terminal state of the repeatable computation; and
dependent at least in part upon a comparison of at least a portion of the original terminal state and at least a portion of the new terminal state, determine whether the repeatable computation has been successfully repeated.

2. The system as recited in claim 1, wherein the determination of whether the repeatable computation has been successfully repeated is further dependent on a client-specified success criterion.

3. The system as recited in claim 1, wherein the original initial machine image comprises one or more of:
a memory image of the original computing environment;
configuration information describing configuration parameters of the original computing environment; or a state of a mass storage resource configured for use by the original computing environment.

4. The system as recited in claim 1, wherein the memory is further configured to store instructions executable by the processor to:
assign a unique identifier to the repeatable computation;
map the unique identifier of the repeatable computation to storage locations, in the storage device, of the original machine image and the original terminal machine image associated with the respective original initial and terminal states of the repeatable computation; and
in response to a determination that the client request to repeat the repeatable computation specifies the unique identifier assigned to the repeatable computation, retrieve the original machine image and the original terminal machine image from the mapped storage locations in the storage device to restore the original computing environment.

5. The system as recited in claim 1, wherein the memory is further configured to store instructions executable by the processor to—selectively disable computing features presented by a physical computer system upon which the original computing environment is restored, such that the disabled computing features are not available to software executing on restored computing environment.

6. The system as recited in claim 1, wherein subsequent to generation of the original terminal state and prior to indicating completion of the client request to initially perform the repeatable computation, the memory is further configured to store instructions executable by the processor to:
instruct that the repeatable computation be performed on the original computing environment to generate a test terminal state of the repeatable computation; and
dependent upon a comparison of the original terminal state and the test terminal state, determine whether the initial performance of the repeatable computation has been successfully performed according to a success criterion.

7. The system as recited in claim 1, wherein:
the original initial machine image of the original computing environment comprises at least a snapshot of resource instances implemented in the original computing environment; and
to restore the original computing environment, the memory is further configured to store instructions executable by the processor to:
based at least in part upon the snapshot of resource instances comprised in the original initial machine image, initialize at least a portion of the resource instances implemented in the original computing environment.

8. The system as recited in claim 1, wherein:
the original initial machine image of the original computing environment comprises at least configuration information describing configuration parameters of an original physical computer system implementing the original computing environment; and
to restore the original computing environment, the memory is further configured to store instructions executable by the processor to:
based at least in part upon the configuration comprised in the original initial machine image, assign at least a portion of processes implemented in the original computing environment to another physical computer system with configuration parameters that are at least partially common to the configuration parameters of the original physical computer system.

9. The system as recited in claim 1, wherein to instruct that the repeatable computation be performed on the original computing environment to generate an original terminal state of the repeatable computation, the memory is further configured to store instructions executable by the processor to generate and store an original initial machine image associated with an original initial state of the repeatable computation at a plurality of checkpoints, wherein each of the checkpoints is indicative of the original initial state of the repeatable computation at a corresponding point in time during the repeatable computation.

10. A method, comprising:
performing by a computer system comprising a processor and a memory:
in response to a client request to initially perform a computation that has been identified as a repeatable computation:
generating an original initial machine image of an original computing environment associated with an original initial state of the repeatable computation,
storing the original initial machine image on a storage device,
instructing that the repeatable computation be performed on the original computing environment to generate an original terminal state of the repeatable computation,
generating an original terminal machine image of the original computing environment, wherein the original terminal machine image includes at least a portion of the original terminal state of the repeatable computation, and
storing the original terminal machine image on the storage device;
in response to a client request to repeat the repeatable computation:
restore the original computing environment as a restored computing environment based at least in part upon the original initial machine image, and
instruct that the repeatable computation be performed on the restored computing environment to generate a new terminal state of the repeatable computation; and
dependent at least in part upon a comparison of at least a portion of the original terminal state and at least a portion of the new terminal state, determine whether the repeatable computation has been successfully repeated.

11. The method as recited in claim 10, further comprising:
assigning a unique identifier to the repeatable computation;
mapping the unique identifier of the repeatable computation to storage locations, in the storage device, of the original machine image and the original terminal machine image associated with the respective original initial and terminal states of the repeatable computation;
in response to a determination that the client request to repeat the repeatable computation specifies the unique identifier assigned to the repeatable computation, retrieving the original machine image and the original terminal machine image from the mapped storage locations in the storage device to restore the original computing environment.

12. The method as recited in claim 10, wherein:
the original initial machine image of the original computing environment comprises a snapshot of resource instances implemented in the original computing environment; and to restore the original computing environment, the method further comprises:
  based at least in part upon the snapshot of resource instances comprised in the original initial machine image, initializing at least a portion of the resource instances implemented in the original computing environment.

13. The method as recited in claim 10, wherein:
the original initial machine image of the original computing environment comprises at least configuration information describing configuration parameters of an original physical computer system implementing the original computing environment; and
to restore the original computing environment, the method further comprises:
  based at least in part upon the configuration comprised in the original initial machine image, assigning at least a portion of processes implemented in the original computing environment to another physical computer system with configuration parameters that are at least partially common to the configuration parameters of the original physical computer system.

14. The method as recited in claim 10, wherein instructing that the repeatable computation be performed on the original computing environment to generate the original terminal state of the repeatable computation comprises generating and storing an original initial machine image associated with an original initial state of the repeatable computation at a plurality of checkpoints, wherein each of the checkpoints is indicative of the original initial state of the repeatable computation at a corresponding point in time during the repeatable computation.

15. The method as recited in claim 10, further comprising:
  subsequent to generation of the original terminal state and prior to indicating completion of the client request to initially perform the repeatable computation, instructing that the repeatable computation be performed on the computing environment to generate a test terminal state of the repeatable computation; and
  dependent upon a comparison of the original terminal state and the test terminal state, determining whether the initial performance of the repeatable computation has been successfully performed according to a success criterion.

16. The system as recited in claim 15, wherein to determine that the initial performance of the repeatable computation has been successfully performed, the success criterion requires that the entire test terminal state match the entire original terminal state.

17. A non-transitory computer-accessible storage medium that stores a program of instructions that, when executed by a computer system, cause the computer system to:
  in response to a client request to initially perform a computation that has been identified as a repeatable computation:
    generate an original initial machine image of an original computing environment associated with an original initial state of the repeatable computation,
    store the original initial machine image on a storage device,
    instruct that the repeatable computation be performed on the original computing environment to generate an original terminal state of the repeatable computation,
    generate an original terminal machine image of the original computing environment, wherein the original terminal machine image includes at least a portion of the original terminal state of the repeatable computation, and
    store the original terminal machine image on the storage device;
  in response to a client request to repeat the repeatable computation:
    restore the original computing environment as a restored computing environment based at least in part upon the original initial machine image, and
    instruct that the repeatable computation be performed on the restored computing environment to generate a new terminal state of the repeatable computation; and
    dependent at least in part upon a comparison of at least a portion of the original terminal state and at least a portion of the new terminal state, determine whether the repeatable computation has been successfully repeated.

18. The non-transitory computer-accessible storage medium as recited in claim 17, wherein the program of instructions, when executed by the computer system, further cause the computer system to:
  assign a unique identifier to the repeatable computation;
  map the unique identifier of the repeatable computation to storage locations, in the storage device, of the original machine image and the original terminal machine image associated with the respective original initial and terminal states of the repeatable computation; and
  in response to a determination that the client request to repeat the repeatable computation specifies the unique identifier assigned to the repeatable computation, retrieve the original machine image and the original terminal machine image from the mapped storage locations in the storage device to restore the original computing environment.

19. The non-transitory computer-accessible storage medium as recited in claim 17, wherein:
the original initial machine image of the original computing environment comprises at least configuration information describing configuration parameters of an original physical computer system implementing the original computing environment; and
to restore the original computing environment, the program of instructions, when executed by the computer system, further cause the computer system to:
  based at least in part upon the configuration comprised in the original initial machine image, assign at least a portion of processes implemented in the original computing environment to another physical computer system with configuration parameters that are at least partially common to the configuration parameters of the original physical computer system.

20. The non-transitory computer-accessible storage medium as recited in claim 17, wherein:
the original initial machine image of the original computing environment comprises at least a snapshot of resource instances implemented in the original computing environment; and
to restore the original computing environment, the program of instructions, when executed by the computer system, further cause the computer system to:
based at least in part upon the snapshot of resource instances comprised in the original initial machine image, initialize at least a portion of the resource instances implemented in the original computing environment.

* * * * *